United States Patent
Morrissey et al.

(10) Patent No.: US 6,520,464 B1
(45) Date of Patent: Feb. 18, 2003

(54) ASSEMBLY FOR FACILITATING MOUNTING AND REMOVAL OF AN ARTICLE

(75) Inventors: Gary Richard Morrissey, Medford, MA (US); Isak Kaysreman, Needham, MA (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 09/596,417

(22) Filed: Jun. 12, 2000

(51) Int. Cl.$^7$ .................................................. F16L 3/08
(52) U.S. Cl. .................. 248/222.52; 248/634; 403/348; 403/350; 411/354
(58) Field of Search ........................... 248/230.1, 230.2, 248/200.1, 222.52, 222.51, 222.14, 231.9, 49–57, 68.1, 73, 74.1, 74.2, 634, 635; 403/348, 350, 351, 374.1; 411/512, 354, 433, 511; 324/207.15, 207.11

(56) References Cited

U.S. PATENT DOCUMENTS

| | | | |
|---|---|---|---|
| 4,165,853 A | | 8/1979 | Brandt |
| 4,419,026 A | * | 12/1983 | Leto ............................. 403/104 |
| 4,857,706 A | * | 8/1989 | Diamond ................. 403/350 X |
| 5,188,399 A | * | 2/1993 | Durina .................... 403/348 X |
| 5,356,183 A | * | 10/1994 | Cole ........................... 403/350 |
| 5,407,363 A | * | 4/1995 | Polgar et al. ........... 248/222.52 |
| 5,685,199 A | * | 11/1997 | Malone ...................... 74/502.4 |
| 5,698,975 A | * | 12/1997 | Kayserman ............. 324/207.15 |
| 5,915,902 A | | 6/1999 | Patterson et al. |
| 5,919,018 A | * | 7/1999 | Chuang ....................... 411/149 |
| 5,921,734 A | | 7/1999 | Kataoka |
| 5,931,598 A | * | 8/1999 | Wang ........................... 403/351 |
| 6,027,294 A | | 2/2000 | Newby |
| 6,108,944 A | * | 8/2000 | Savoie .................... 403/348 X |
| 6,113,329 A | | 9/2000 | Moroi et al. |
| 6,179,512 B1 | * | 1/2001 | Gibson et al. ........... 403/374.1 |

FOREIGN PATENT DOCUMENTS

DE       2817734     * 11/1978

* cited by examiner

Primary Examiner—Leslie A. Braun
Assistant Examiner—Tan Le
(74) Attorney, Agent, or Firm—Himanshu S. Amin; Alexander M. Gerasimow; William R. Walbrun

(57) ABSTRACT

A mounting arrangement facilitates mounting and removal of an article, such as an elongated housing for a proximity sensor. A bracket and a coupling each have an aperture extending therethrough for receiving the article. A central axis extends through the apertures. The coupling includes a plurality of spaced apart flexures located adjacent the coupling aperture. Each flexure includes an axially extending arm portion for engaging a respective part of an inner sidewall portion of the bracket aperture. Upon rotation of the coupling about the central axis, the bracket sidewall portion engages or releases the arms of the coupling to effect radial movement of the arms. In particular, rotation of the coupling in one direction about the central axis relative to the bracket urges the arms radially inward and rotation of the coupling in the other direction permits a radially outward movement thereof.

16 Claims, 3 Drawing Sheets

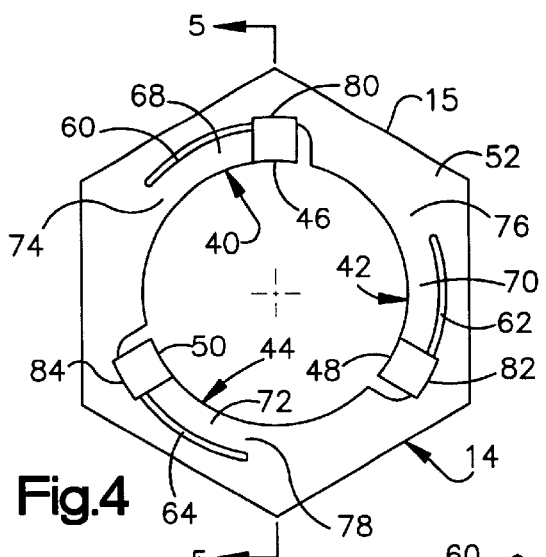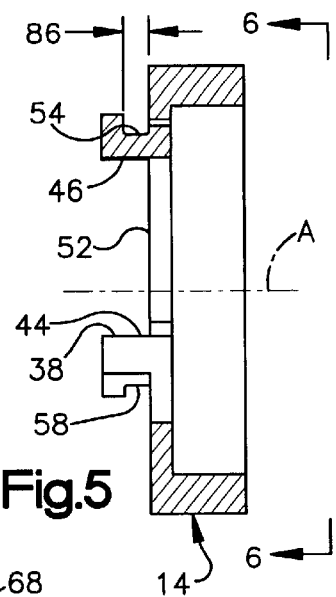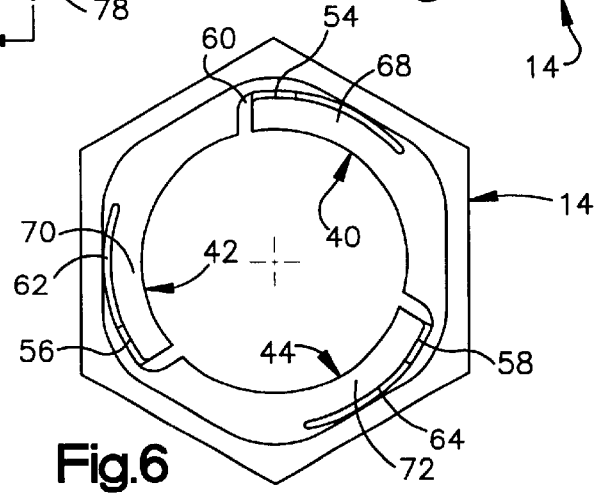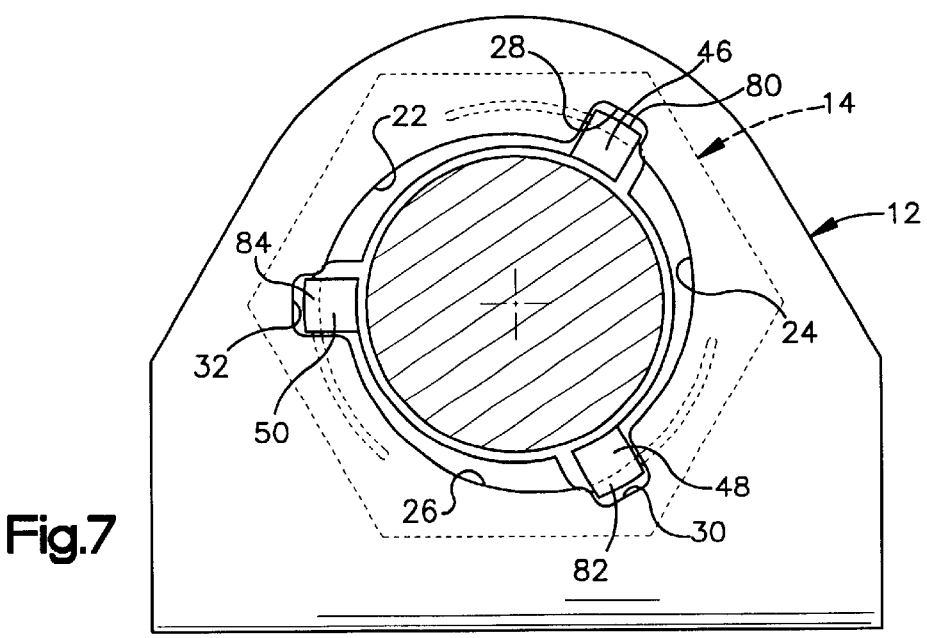

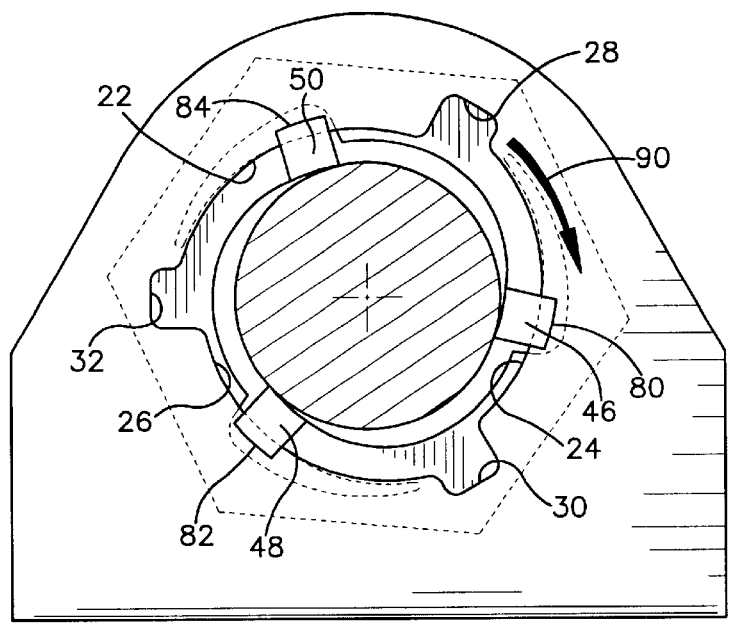
Fig.8
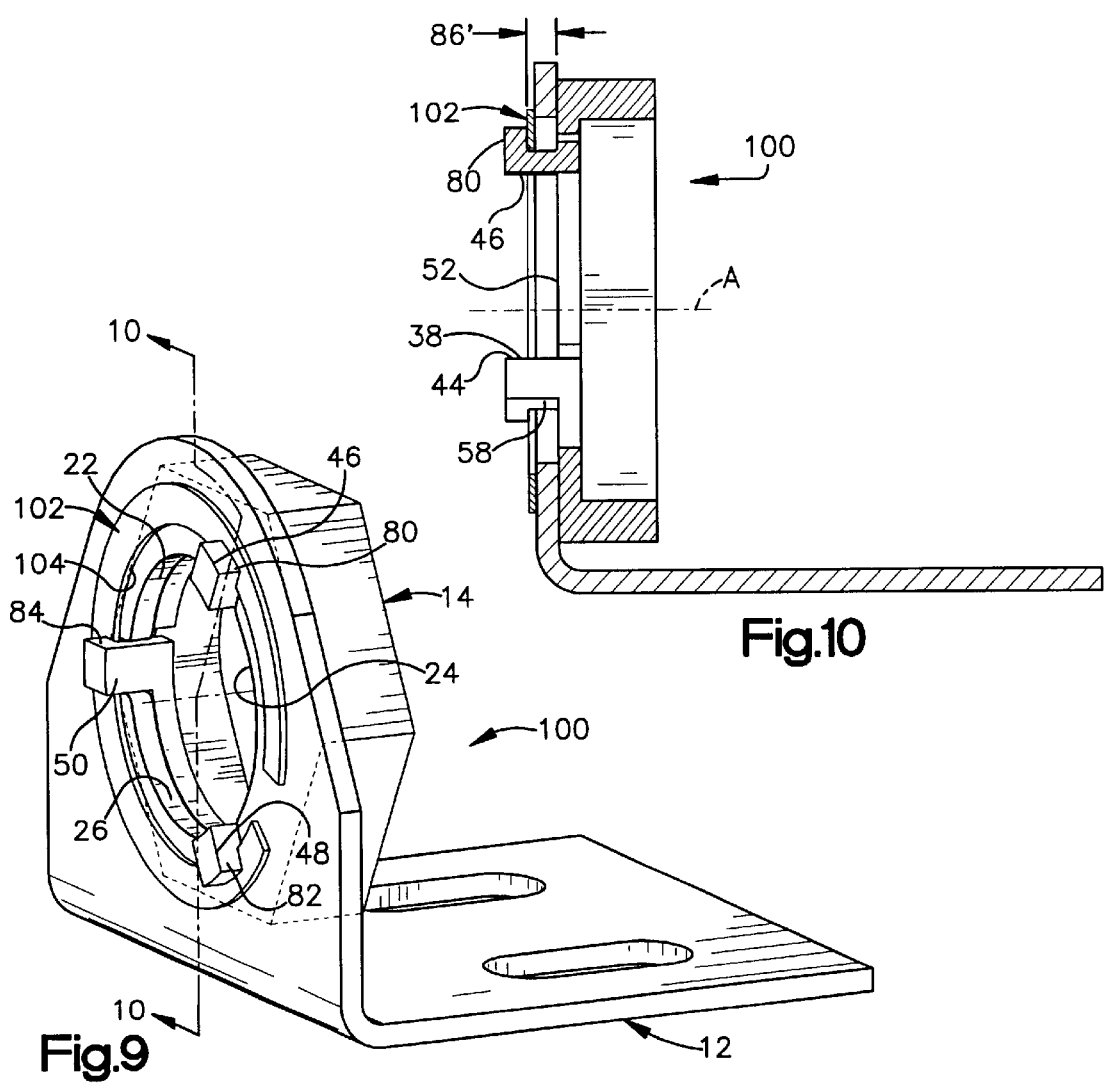
Fig.10
Fig.9

ASSEMBLY FOR FACILITATING MOUNTING AND REMOVAL OF AN ARTICLE

TECHNICAL FIELD

The present invention generally relates to a mounting arrangement and, more particularly, to an assembly for facilitating mounting and removal of an article, such as a proximity sensor.

BACKGROUND

Various types of proximity sensors are used for detecting the presence or absence of an object. Common types of non-contact proximity sensors include inductive proximity sensors, capacitive proximity sensors, ultrasonic proximity sensors, and photoelectric sensors. Such sensors, for example, may be used in motion or position applications, conveyor system control applications, process control applications, robotic welding applications, machine control applications, liquid level detection applications, selecting and counting applications, as well as other known applications.

An inductive proximity sensor, for example, includes an oscillator that provides an oscillating signal to an inductive coil, which provides an electromagnetic field at a predetermined frequency. As an electrically conductive object moves within the field, eddy currents develop within the object in response to the oscillating electromagnetic field. The eddy currents alter the amplitude of the oscillating signal being provided to the coil. The amplitude of the oscillator signal typically is evaluated to provide an output signal indicative of the presence or absence of the object within the electromagnetic field. The proximity sensor is mounted at a desired location to provide its proximity sensing function.

Various mounting arrangements may be utilized to mount a proximity sensor. By way of example, a sensor mounted within an elongated, cylindrical threaded housing may be mounted by employing a pair of threaded nuts. The nuts are threaded along the sensor housing to secure the housing relative to a bracket. When a threaded proximity sensor housing is utilized in an industrial environment, however, dust and/or other particles tend to collect in the threads, thereby inhibiting threading of the nuts. As a result, it is often difficult to adjust and/or remove the nuts from the housing. This, in turn, may increase the amount of time associated with replacing or adjusting the sensor.

Another type of proximity sensor mounting arrangement relates to a clamp mechanism, such as in the form of a pair of opposed mating jaws. The jaws are secured relative to each other to clamp the sensor housing at a desired position between the jaws. Usually, a pair of fasteners is employed to implement the clamping function and frictionally hold the sensor in place.

In view of presently available mounting arrangements, there is a need for an improved assembly to facilitate mounting an article.

SUMMARY

The present invention relates to a mounting arrangement for facilitating mounting and removal of an article, such as a proximity sensor. A bracket has an aperture extending through the bracket that defines an inner bracket sidewall portion. A coupling also has an aperture extending therethrough for receiving the article, with a central axis extending through the apertures of the bracket and coupling. The coupling also includes a plurality of spaced apart flexures located adjacent the coupling aperture. Each flexure includes an axially extending arm for engaging a respective part of an inner bracket sidewall portion. Upon rotation of the coupling in a direction relative to the bracket about the central axis, the inner bracket sidewall portion engages the arms so as to urge the arms radially. In particular, rotation of the coupling in one direction relative to the bracket about the central axis urges the arms radially inward and rotation of the coupling in the other direction about the axis permits radially outward movement thereof. As a result, the coupling is able to engage and secure an article extending through the coupling while in a first position relative to the bracket and permit movement of the article while in another position relative to the bracket.

An aspect of the present invention relates to a mounting assembly. The assembly includes a bracket having an aperture extending therethrough to define an inner sidewall surface portion. A coupling has an aperture extending through the coupling, with a central axis extending through the apertures of the bracket and coupling. The coupling also has a plurality of flexures spaced about the axis adjacent the aperture of the coupling. Upon rotation of the coupling in a first direction relative to the bracket, the inner sidewall surface portion of the bracket engages each of the plurality of flexures for urging the flexures radially.

Another aspect of the present invention relates to a mounting arrangement for aligning an article relative to an axis. The mounting arrangement includes a bracket having an aperture extending through the bracket substantially coaxially with the axis. The aperture has a plurality of arcuately extending shoulder surface portions, each shoulder surface portion having a decreasing radius in a direction relative to the axis. A coupling has an aperture extending through the coupling substantially coaxially with the axis. The coupling includes a plurality of circumferentially spaced apart flexures having symmetrically spaced apart arms adjacent the aperture. Upon relative rotation between the coupling and bracket, each arm engages a corresponding shoulder surface portion for urging each arm approximately a same radial distance. As a result, an article extending through the coupling and bracket may be urged into substantially coaxial alignment with the axis.

To the accomplishment of the foregoing and related ends, the invention, then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4 is a front elevation of a coupling portion of a mounting arrangement in accordance with the present invention;

FIG. 5 is a side sectional view of the coupling taken along line 5—5 of FIG. 4;

FIG. 6 is a side view of the coupling taken along line 6—6 of FIG. 5;

FIG. 7 is a partial sectional view taken along line 7—7 of FIG. 2, illustrating a first condition of the mounting arrangement in accordance with the present invention;

FIG. 8 is a partial sectional view, similar to FIG. 7, illustrating a second condition of the mounting arrangement in accordance with the present invention;

FIG. 9 is a perspective view of a mounting arrangement in accordance with another aspect of the present invention; and FIG. 10 is a side sectional view of a mounting arrangement taken along line 10—10 of FIG. 9.

DESCRIPTION OF THE INVENTION

Figure 1:
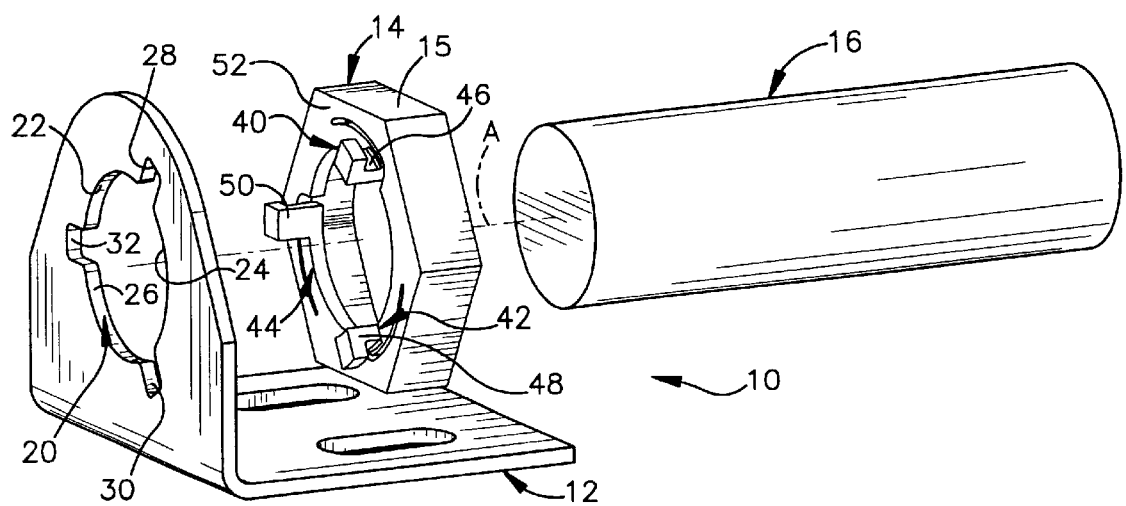
FIG. 1 is an exploded perspective view of a mounting arrangement in accordance with the present invention.

Various aspects of the present invention are described below in connection with FIGS. 1–10, in which like reference characters refer to like parts throughout the various views.

Figure 2:
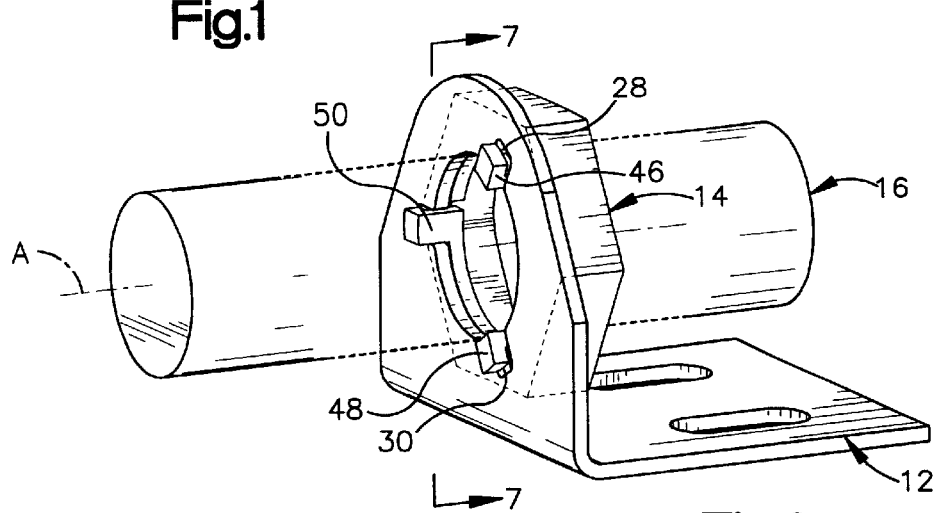
FIG. 2 is an assembled view of the mounting arrangement of FIG. 1 in accordance with the present invention.

FIGS. 1 and 2 illustrate a mounting assembly 10 in accordance with an aspect of the present invention. In particular, FIG. 1 shows the assembly 10 in an exploded view and FIG. 2 shows the assembly 10 in an assembled view. Briefly stated, the mounting assembly 10 includes a bracket 12 and a coupling 14 that cooperate for mounting an article 16, such as an elongated cylindrical body (e.g., a proximity sensor housing). The housing 16 has a central axis, indicated at A, extending longitudinally through the housing, coupling 14, and bracket 12. The bracket 12 may be attached to a structure at a desired position, such as by inserting appropriate fasteners (not shown) through holes formed in part of the bracket. The coupling 14, which may have a faceted (e.g., hexagonal) exterior portion 15, so that it may be rotated about the axis A with an appropriately configured tool (e.g., a wrench) for fixing or loosening the housing 16 at a desired position relative to the bracket 12.

The bracket 12, for example, is an L-shaped bracket formed of a sheet of rigid material, such as steel, plastic or other suitable material. The bracket 12 includes an aperture 18 extending through a generally planar portion of the bracket 12, which is substantially coaxial with the housing axis A. The aperture 18 defines an inner sidewall portion 20 of the bracket 12, which includes a plurality of symmetric shoulder surface portions 22, 24 and 26. Additional slots 28, 30, and 32 also extend through the bracket 12 so as to intersect the aperture 18.

Figure 3:
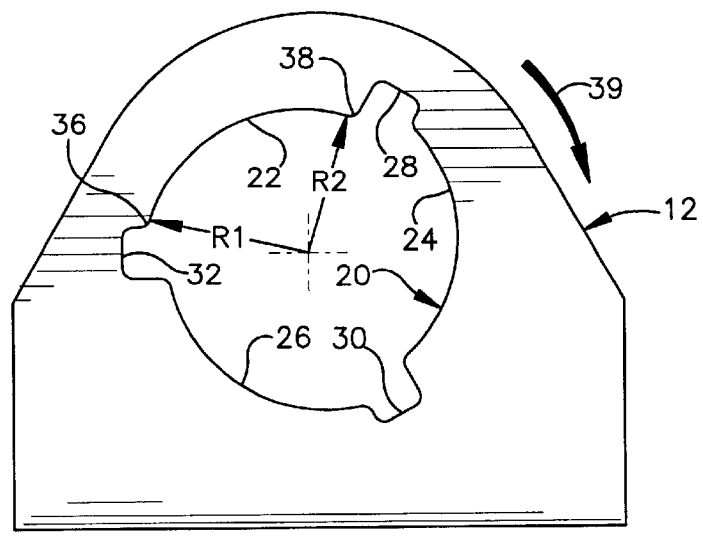
FIG. 3 is a front view of a bracket portion of a mounting assembly in accordance with the present invention.

With reference to FIG. 3, the slots 28–32 are formed through the bracket in a spaced apart symmetric relationship about the axis A (e.g., about 120° apart). Each shoulder surface portion 22, 24, 26 extends between a pair of adjacent slots 28–32, such as an arcuately extending arc about the central axis A between adjacent slots. Each shoulder portion 22, 24, 26 extends approximately the same circumferential distance. With particular reference to shoulder portion 22, the shoulder portion has end points 36 and 38. The shoulder portion 22 has a radius R1 at end 36 and a radius R2 at end 38, which is different from radius R1. In the illustrated example of FIG. 2, the radius R1 at end 36 is greater than the radius R2 at end 38, with the radius decreasing between ends 36 and 38 in the direction of arrow 39.

It is to be understood and appreciated that each shoulder portion 22, 24, 26 is similarly configured as that described with respect to shoulder portion 22; however, a detailed descriptions of each shoulder portion has been omitted for sake of brevity. Briefly stated, each shoulder portion 22, 24, 26 has a decreasing radius in the direction of the arrow 39 along an arc extending between corresponding adjacent slots 28–32. It is to be understood and appreciated that, while the shoulder portions 22, 24, and 26 are illustrated as arcs having a continuously decreasing radius, other shoulder configurations may be employed. For example, the shoulder portions may have stepped or incrementally decreasing radiuses.

Referring to FIGS. 4–6, the coupling 14 includes a plurality of flexures 40, 42 and 44 arranged in a spaced apart relationship relative to the axis A. When the mounting assembly 10 is assembled (as shown in FIG. 2), each flexure 40, 42, 44 cooperates with a corresponding shoulder portion 22, 24, 26 of the bracket 12 to effect substantially radial movement of each flexure relative to the axis A in response to relative rotation between the bracket 12 and coupling 14. The radial movement of each flexure 40, 42, 44 may result in a tightening or loosening of the article 16 disposed within the aperture 38 according to the direction of the relative rotation between the coupling 14 and the bracket 12.

By way of example, each flexure 40, 42, 44 includes a respective arm 46, 48, 50 extending from a common side 52 of the coupling 14. Each arm 46, 48, 50 extends axially a distance that at least approximates the thickness of the bracket 12 where the aperture 16 is formed therethrough. Accordingly, when the mounting arrangement is assembled, as shown in FIG. 2, the arms 46, 48, and 50 extend axially through the bracket aperture 18. In addition, a radially outer surface 54, 56, 58 of each respective arm 46, 48, 50 is spaced from the central axis A a distance that approximates the radius R1, but is less than the radius R2 of the bracket (e.g., the radius of the radially outer portion of the arm is intermediate R and R2). Thus, as the coupling 14 is rotated in the direction of decreasing radius relative to the bracket 12 about the axis A, the shoulder portions 22, 24, and 26 engage and urge the arms 46, 48, and 50 of the flexures 40, 42, and 44 radially inward (see, e.g., FIGS. 7 and 8).

As shown in FIGS. 4 and 6, for example, each flexure 40, 42, 44 includes a respective slit 60, 62, 64 is formed through the coupling 14 adjacent each respective flexure. The slits 60, 62, and 64 operate to facilitate radial movement of the flexure arms 46, 48, and 50, respectively. Each slit 60, 62, 64, for example, is in the form of an arcuately extending channel (e.g., an undercut) spaced from the inner sidewall defined by the aperture 38. In particular, each slit 60, 62, 64 intersects the coupling aperture 38 to define a corresponding leg member 68, 70, 72. The leg members 68, 70, and 72 are moveable (generally radially) about a fulcrum 74, 76, 78 associated with each respective flexure 40, 42, 44. Each fulcrum is located at the juncture between the leg and the base portion of the coupling (where the channel ends).

Referring to FIGS. 2 and 5, each flexure arm 46, 48, 50 also may include a retaining feature (or a foot) 80, 82, 84 extending radially outwardly from the respective arm, in accordance with an aspect of the present invention. Each retaining feature 80, 82, 84 is dimensioned and configured to fit through a corresponding slot (e.g., 30, 32, 28) of the bracket 12 as the arms 46, 48, and 50 are inserted axially through corresponding slots. The axial distance between the surface 52 of the coupling and each retaining feature 80, 82, 84, which distance is indicated at 86, may approximate the thickness of the bracket 12. Advantageously, the retaining features 80, 82, and 84 cooperate with (e.g., engage) a distal surface of the bracket 12 to provide a retaining mechanism, which inhibits axial movement of the coupling relative to the bracket, as shown in FIG. 3.

The coupling 14 may be formed of a generally rigid material, such as a metal, plastic, resin or other material, that permits some amount of flexure movement. It is to be understood and appreciated that the flexure configuration shown and described herein is an example of a possible implementation. Those skilled in the art will appreciate other flexure configurations that may be implemented in accordance with the present invention. For example, an aperture or hole may be formed axially through the coupling adjacent each arm to facilitate radial movement of the arm. Additionally, different materials may further permit different flexure configurations, as some materials may be more resilient or elastic than others. All such flexure configurations are deemed to be within the scope of the present invention.

FIGS. 7 and 8 illustrate different operating conditions of the assembly of FIG. 2. FIG. 7 shows the arms 46, 48 and 50 inserted through and axially aligned with the respective slots 28, 30, and 32. The shoulder portions 22, 24, and 26 do not engage the flexures 40, 42, and 44. As a result, the arms 46, 48 and 50 do not engage and fix the housing 16 relative to the coupling.

FIG. 8 shows another condition of the mounting assembly in which the coupling 14 has been rotated in the direction of arrow 90 relative to the bracket 12. The direction of the arrow 90 is in the direction of decreasing radius for each shoulder portion 22, 24, 26 of the bracket 12. As the coupling 14 rotates about the axis A in the direction of arrow 90, each shoulder portion 22, 24, 26 engages and urges a respective arm 46, 48, 50 radially inward a distance commensurate with the amount of rotation. The amount of radial movement of the arms 46, 48 and 50 also depends upon the contour of the respective shoulder portions 22, 24, and 26. With a certain amount of rotation, the arms 46, 48, and 50 eventually are urged into engagement with the exterior of the housing 16. The contact between the arms 46, 48, and 50 and the housing 16 provides frictional forces to restrict movement of the housing relative to the coupling 14 and, in turn, the bracket 12. The frictional forces are functionally related to the amount of torque used to rotate the coupling 14 in the direction of the arrow 90.

Rotation of the coupling 14 in an opposite direction of the arrow 90 relative to the bracket 12 (e.g., in the direction of increasing shoulder radius), removes radially inward forces provided by the shoulders 22, 24, and 26 to the arms 46, 48, and 50. As a result, the arms 46, 48, and 50 are able to move radially outward commensurate with the amount of relative rotation so as to loosen contact with the housing 16. Depending on the elasticity of the coupling, the arms 46, 48 and 50 may return to their original position (FIG. 7) upon an appropriate amount of rotation.

Because, in accordance with an aspect of the present invention, both the arms 46, 48, and 50 and shoulders 22, 24, and 26 are symmetrically arranged relative to the axis A, rotation of the coupling 14 in the direction of the arrow 90 (decreasing shoulder radius) relative to the bracket 12 results in substantially symmetric radial movement of each respective arm. As a result, the mounting assembly is able to align the elongated housing substantially coaxially relative to the central axis A. Accordingly, when the article is a proximity sensor, its aiming along a central axis thereof may be facilitated.

FIGS. 9 and 10 illustrate a mounting arrangement 100 in accordance with another aspect of the present invention, in which like numerals correspond to components previously identified with respect to FIGS. 1–8. A description of the previously identified components is omitted for purposes of brevity, as the foregoing description may be referred to for additional details concerning these elements.

The mounting arrangement 100 includes a retaining ring 102 for helping to inhibit axial movement between the coupling 14 and the bracket 12. The retaining ring 102 includes a radially inner surface 104 having a radius that is less than the outer radius of at least some of the retaining features 80, 82, and 84. The retaining ring 102 circumscribes the arms 46, 48, and 50 (and may contact the arms). The retaining ring 102 has a radially outer extent having a radius sufficient (e.g., greater than the radius R2) to inhibit axial movement of the retaining features through the bracket (even when aligned with the slots 28, 30, and 32). The axial distance between the surface 52 of the coupling and each retaining feature 80, 82, 84, indicated at 86', approximates the thickness of the bracket 12 plus the thickness of the ring 102.

The retaining ring 102, for example, is a C-shaped ring and may be employed in combination with the retaining features 80, 82, and 8 of the arms 46, 48, and 50 to provide a retaining mechanism. Additionally, the retaining ring 102 inhibits removal of the coupling from the bracket so as to create an integral mounting assembly 100 formed of the bracket, coupling, and the retaining ring (shown in FIGS. 9 and 10). In particular, the retaining ring 102 prevents the retaining features 80, 82, and 84 from aligning with and moving axially through the respective slots 30, 32, and 28 formed in the bracket 12. Relative rotation about the axis A between the bracket 12 and coupling 14 is still permitted. As mentioned above, in response to rotation of the coupling 14 in a first direction relative to the bracket 12, the shoulder portions 22, 24, and 26 may engage corresponding arms 50, 46, and 48, respectively, to urge them radially inward. Rotation of the coupling 14 in the opposite direction relative the bracket 12 removes the radial forces provided by the shoulder portions 28–32, such that the arms 46, 48, and 50 so as to permit radially outward movement of the arms a radial distance commensurate with the amount of rotation.

While the illustrated example of the retaining ring 102 is a generally C-shaped ring, it is to be understood and appreciated that other configurations of retaining rings also may be utilized in accordance with the present invention. For example, the ring may be in the form of a complete ring or annular washer or the bracket may be configured without the slots 30, 32, and 34, with the bracket performing the function of the ring. Alternatively, the ring 102 may be part of the coupling, such as where the bracket and coupling are fabricated as an integral unit.

Another alternative approach, which is equally applicable to all aspects shown and described herein, is to form the retaining features 80, 82, and 84 after arms 46, 48 and 50 have been inserted axially through the bracket aperture 18 (e.g., where no slots 28, 30, and 32 are formed in the bracket). The retaining features then may be turned radially outward, such that the bracket performs the function of the retaining ring.

In addition, because the inner diameter of the coupling 14 (e.g., the flexures) varies as a function of the radius of the adjacent shoulder sidewall surface, a single size of mounting assembly may be utilized for articles having a range of diameters. This in sharp contrast to a traditional mounting assembly which must be specifically designed within predetermined tolerances to effectively mount an article, such as a proximity sensor. In particular, a threaded proximity sensor requires the use of threaded nuts having a threading configuration and inner diameter corresponding to the threaded housing. A mounting assembly, in accordance with the present invention, may be employed to mount an article having a threaded housing or an article having a smooth housing with equal facility. As a result, fewer parts need to be manufactured for a variety of products and customers need to maintain a smaller inventory of replacement parts.

An assembly 10, 100, in accordance with the present invention, also facilitates installation and maintenance of the housing 16, such as a proximity sensor housing. In particular, the coupling 14 is turned a small distance in one direction to fix the housing 16 at a desired position relative to the bracket 12. Rotating the coupling 14 in the other direction relative to the bracket 12, loosens the housing 16 so that it may easily be moved longitudinally along the axis A to a desired position or removed altogether from the bracket.

It is to be understood and appreciated that the present invention contemplates that the housing 16 may contain any type of sensor, including, for example, an inductive proximity sensor, a capacitive proximity sensor, an ultrasonic proximity sensor, a photoelectric sensor, etc. Suitable proximity sensors include those commercially available from Rockwell Automation of Cleveland, Ohio, although a mounting arrangement in accordance with the present invention is equally applicable to mounting sensors and other mountable devices produced by other manufacturers.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description and the claims, such term is intended to be inclusive in a manner similar to the term "comprising."

What is claimed is:

1. A mounting assembly, comprising:
    a bracket having an aperture extending therethrough to define an inner sidewall surface portion;
    a coupling having an aperture extending through the coupling, a central axis extending substantially coaxially through the apertures of the bracket and coupling, the coupling having a plurality of flexures spaced about the axis adjacent the aperture of the coupling;
    an arm that extends generally axially from each flexure to engage the inner sidewall surface portion to effect generally radially inward deflection of the arm in response to rotation of the coupling in the first direction relative to the bracket; and
    a slit formed axially through the coupling adjacent each respective arm to facilitate substantially radial movement of each flexure;
    wherein, upon rotation of the coupling in a first direction relative to the bracket, the sidewall surface portion of the bracket engages each of the plurality of flexures for urging the flexures radially.

2. The assembly of claim 1, wherein the inner sidewall surface portion further includes a plurality of spaced apart arcuately extending shoulder portions, each arcuately extending shoulder portion having a radius that decreases in the first direction relative to the bracket.

3. The assembly of claim 1, wherein the arms are symmetrically arranged in a circumferentially spaced apart relationship relative to the central axis.

4. The assembly of claim 1, further including a retaining mechanism for inhibiting axial movement of the coupling relative to the bracket.

5. The assembly of claim 4, wherein the retaining mechanism includes a ring that engages the coupling so as to inhibit axial movement of the coupling relative to the bracket.

6. The assembly of claim 1, wherein the coupling has a faceted radially exterior portion.

7. The assembly of claim 1, wherein rotation of the coupling in a first direction about the axis relative to the bracket effects movement of each flexure in a first radial direction and rotation of the coupling in a second direction about the axis relative to the bracket effects movement of each flexure in a second radial direction, which is opposite the first radial direction.

8. A mounting assembly, comprising:
    a bracket having an aperture extending therethrough to define an inner sidewall surface portion;
    a coupling having an aperture extending through the coupling, a central axis extending substantially coaxially through the apertures of the bracket and coupling, the coupling having a plurality of flexures spaced about the axis adjacent the aperture of the coupling; and
    a retaining mechanism for inhibiting axial movement of the coupling relative to the bracket, the retaining mechanism includes a ring that engages the coupling so as to inhibit axial movement of the coupling relative to the bracket, the retaining mechanism further includes an arm extending axially from a side of the coupling from each flexure and terminating in a retaining feature having a radially outwardly extending portion for engaging at least one of the bracket and the retaining ring to inhibit axial movement of the coupling relative to the bracket;
    wherein, upon rotation of the coupling in a first direction relative to the bracket, the sidewall surface portion of the bracket engages each of the plurality of flexures for urging the flexures radially.

9. A mounting assembly, comprising:
    a bracket having an aperture extending therethrough to define an inner sidewall surface portion; and
    a coupling having an aperture extending through the coupling, a central axis extending substantially coaxially through the apertures of the bracket and coupling, the coupling having a plurality of flexures spaced about the axis adjacent the aperture of the coupling, each flexure further includes an arm extending axially from a side of the coupling and terminating in a radially outwardly extending retaining feature for inhibiting axial movement of the coupling relative to the bracket;
    wherein, upon rotation of the coupling in a first direction relative to the bracket, the sidewall surface portion of the bracket engages each of the plurality of flexures for urging the flexures radially.

10. The assembly of claim 9, wherein an radially outer extent of each retaining feature has an outer radius relative to the control axis, the assembly further including a retaining ring circumscribing the arms, the retaining ring having an inner radius that is less than the outer radius of at least some of the retaining features so as to inhibit axial movement of the retaining features through the bracket.

11. The assembly of claim 9, wherein the bracket further includes a plurality of slots formed through the bracket intersect the bracket aperture at a spaced apart relationship corresponding to a spatial relationship of the retaining features, wherein each of the slots permit axial movement of a respective axially aligned retaining feature therethrough until the side of the coupling engages the bracket.

12. A mounting assembly for aligning an article relative to an axis, comprising:

a bracket having an aperture extending through the bracket substantially coaxially with the axis, the aperture defining a plurality of arcuately extending shoulder surface portions about the axis, each shoulder surface portion having a decreasing radius in a direction relative to the axis;

a coupling having an aperture extending through the coupling substantially coaxially with the axis, the coupling including a plurality of circumferentially spaced apart flexures having symmetrically spaced apart arms adjacent the aperture, wherein, upon relative rotation between the coupling and bracket about the axis, each arm engages a corresponding one of the shoulder surface portions for effecting movement of each arm approximately the same distance relative to the axis; and a retaining mechanism for inhibiting axial movement of the coupling relative to the bracket, wherein the retaining mechanism includes a ring that engages the coupling so as to inhibit axial movement of the coupling relative to the bracket, the retaining mechanism further includes a retaining feature extending from an end of each arm distal the coupling, each retaining feature having a radially outwardly extending portion for engaging at least one of the bracket and the retaining ring to inhibit axial movement of the coupling relative to the bracket.

13. A mounting assembly for aligning an article relative to an axis, comprising:

a bracket having an aperture extending through the bracket substantially coaxially with the axis, the aperture defining a plurality of arcuately extending shoulder surface portions about the axis, each shoulder surface portion having a decreasing radius in a direction relative to the axis; and a coupling having an aperture extending through the coupling substantially coaxially with the axis, the coupling including a plurality of circumferentially spaced apart flexures having symmetrically spaced apart arms adjacent the aperture, wherein, upon relative rotation between the coupling and bracket about the axis, each arm engages a corresponding one of the shoulder surface portions for effecting movement of each arm approximately the same distance relative to the axis, wherein each arm extends axially from a side of the coupling and terminates in a retaining feature having a radially outwardly extending foot for inhibiting axial movement of the coupling relative to the bracket.

14. The assembly of claim 13, wherein an radially outer extent of each retaining feature has an outer radius relative to the central axis, the assembly further including a retaining ring circumscribing the arms, the retaining ring having an inner radius that is less than the outer radius of at least some of the retaining features so as to inhibit axial movement of the coupling relative to the bracket by inhibiting movement of the retaining features axially through the bracket.

15. The assembly of claim 13, wherein the bracket further includes a plurality of slots formed through the bracket in spaced apart relationship corresponding to the spatial arrangement of the retaining features and intersecting the bracket aperture, wherein each of the slots permits axial movement of a respective axially aligned retaining feature therethrough.

16. A mounting arrangement, comprising:

a proximity sensor housing having an elongated cylindrical sidewall, with a central longitudinal axis extending through the housing;

a bracket having an aperture extending therethrough to define an inner sidewall surface portion;

a coupling having an aperture extending through the coupling, the central axis extending substantially coaxially through the apertures of the bracket and coupling, the coupling having a plurality of arm including flexures spaced about the axis adjacent the aperture of the coupling, the housing extending longitudinally through apertures of the bracket and the coupling; and a retaining mechanism for inhibiting axial movement of the coupling relative to the bracket;

wherein, upon rotation of the coupling in a first direction relative to the bracket, the sidewall surface portion of the bracket engages each of the plurality of flexures for radially urging each flexure toward the central axis and into engagement with the housing;

wherein the retaining mechanism includes a ring that engages the coupling so as to inhibit axial movement of the coupling relative to the bracket, wherein the retaining mechanism further includes a retaining feature extending from an end of each arm distal the coupling, each retaining feature having a radially outwardly extending portion for engaging at least one of the bracket and the retaining ring to inhibit axial movement of the coupling relative to the bracket.

* * * * *